United States Patent [19]

Stangl

[11] 3,958,913

[45] May 25, 1976

[54] COOLING DEVICE FOR TUBULAR SHEETING

[75] Inventor: Georg Stangl, Ehring, Germany

[73] Assignee: Hoechst Aktiengesellschaft, Frankfurt am Main, Germany

[22] Filed: Nov. 26, 1974

[21] Appl. No.: 527,445

[30] Foreign Application Priority Data

Dec. 1, 1973 Germany.......................... 2359975

[52] U.S. Cl............................... 425/445; 425/72 R; 425/392
[51] Int. Cl.² ......................................... B29C 25/00
[58] Field of Search ............. 425/383, 72, 445, 392, 425/393

[56] References Cited
UNITED STATES PATENTS

| | | | |
|---|---|---|---|
| 3,167,814 | 2/1965 | Corbett................................ | 425/72 |
| 3,749,540 | 7/1973 | Upmeier............................ | 425/72 X |
| 3,775,523 | 11/1973 | Haley................................ | 425/72 X |
| 3,804,567 | 4/1974 | Recknagel..................... | 425/445 X |

*Primary Examiner*—Robert L. Spicer, Jr.
*Attorney, Agent, or Firm*—Connolly and Hutz

[57] ABSTRACT

The cooling device consists of a plurality of cooling elements which are arranged in such a manner that they surround the tubular sheeting without interspace. Cooling elements with plane inner surface alternate with cooling elements with curved inner surface, the plane surfaces and the projections of the curved surfaces each have the shape of a regular trapezoid. The cooling elements can be adjusted to the diameter of the tubular sheeting in transverse as well as in oblique direction with respect to the axis of the hollow space formed by the cooling elements.

4 Claims, 7 Drawing Figures

FIG.4
FIG.5
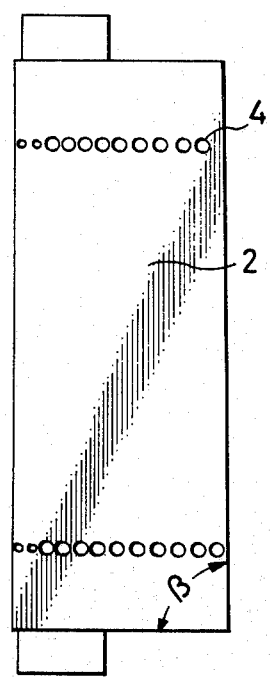
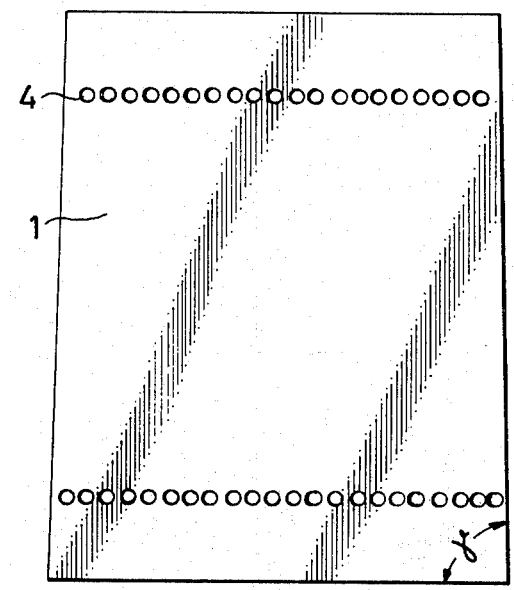
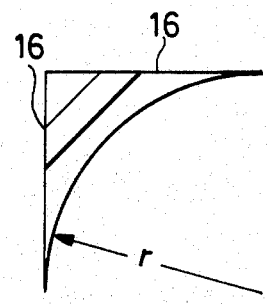
FIG.6
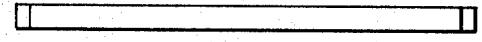
FIG.7

COOLING DEVICE FOR TUBULAR SHEETING

This invention relates to a cooling device following the extruder head for tubular sheeting obtained by extrusion and blow molding. The device consists of displaceable cooling elements cooled by a cooling agent and forming a cooling surface surrounding the tubular sheeting to be cooled.

In the extrusion of thermoplastic materials the still tough and flexible tubes emerging from the extruder are solidified and calibrated by passing them through cooling devices following the extruder head.

German Offenlegungsschrift No. 2,003,289 provides a cooling device for tubular sheeting composed of arc-like cooling segments traversed by a cooling medium and forming a cylindrical cooling surface surrounding the tubular sheeting. Each time several small cooling segments are fastened on a common support one after the other and at distances with respect to one another. The individual rows of cooling segments form cycles on which the segments are in staggered position so that the segments of one cycle are positioned in the interspaces between the segments of the adjacent cycle. In this manner a hollow cooling cylinder is formed, the diameter of which can be varied within a wide limit by shifting the cooling segments in transverse direction with respect to the cylinder axis. The cooling surface formed in this manner is closed without interspace only with the most narrow adjustment of the segments. When the cylinder diameter is enlarged, i.e. wider tubes are to be cooled, interspaces necessarily form transversely to the tube axis. When the tube is passed through the cylinder it is not uniformly cooled since its contact with the cooling segments is interrupted at regular intervals. Moreover, the tubes may bulge at the interspaces owing to the internal pressure of a supporting gas. A further reason for the non uniform cooling of the tubes is the staggered position of the individual rows of cooling segments so that the first contact of the tube emerging from the extruder and entering the cooling device does not take place at the same level and hence, under different heat conditions. Non uniform cooling of the extruded tough tubular sheeting results, however, in extremely detrimental tensions in the cooled tube or the flat sheeting.

A further drawback of the aforesaid cooling device resides in the fact that the space embraced by the cooling segments has a cylindrical shape over the entire cooling length, i.e. the diameter is equal everywhere. When an extruded tubular film is cooled by the first cooling segments it shrinks whereby its diameter is slightly reduced so that during the further passage of the tube through the cylindrical cooling zone a close contact with the cooling surface and an unobjectional guide of the tube is no longer ensured.

It is therefore the object of the present invention to develop a cooling device for tubular sheeting which does not have the aforesaid disadvantages. The cooling device in accordance with the invention is characterized in that the cooling bodies or elements form a closed and variable cooling zone and are in contact with the tubular sheeting over the whole cooling surface.

The cooling surface of the device according to the invention is composed of cooling elements having a flat surface which alternate with cooling elements having a curved surface, the inner surfaces of the flat elements and the projections of the inner surfaces of the curved cooling elements forming regular trapezoids and the flat as well as the curved cooling elements being adjustable in transverse and oblique direction with respect to the axis of the cooling zone.

In the following description the cooling elements having a flat inner surface are denoted cooling plates while the cooling elements having a curved inner surface are designated "cooling segments".

The inner surface of a cooling segment corresponds to a segment of a cylinder jacket the cutting edges of which are inclined with respect to a generatric of the cylinder, i.e. in an acute angle. In a preferred embodiment the cooling segments have a triangular shape with curved inner surface ending in two acute edges and two flat outer surfaces of equal size forming a rectangle or an angle of more than 90° at their line of junction. In this manner it is ensured that the acute outer edges lie closely on the cooling plates.

If projected on a plane the inner surface of the cooling segment forms a regular trapezoid, the acute inner angle of which is designated by the letter $\beta$ and determines the degree of constriction of the outer edges of the cooling segments. By the trapezoidal shape of the cooling segments it is ensured that on passing the cooling zone the tubular sheeting touches the edges of the cooling segments at the transition of one cooling element to the other only at one point of its outer wall so that the danger of a longitudinal marking in the finished tubular sheeting is eliminated.

The cooling plates have a plane regular trapezoidal inner surface and preferably also a plane regular trapezoidal outer surface. The acute angle between the base and one side is designated by the letter $\gamma$. The trapezoidal shape of the cooling plates ensures that with any possible position of the cooling elements the embraced hollow space is fully closed.

The cooling device in accordance with the invention comprises at least three cooling plates and at least three cooling segments, preferably from three to ten cooling plates and from three to ten cooling segments and more preferably four cooling plates and four cooling segments. The two types of cooling elements are in alternate position and form a closed hollow cooling zone, the lateral edges of the cooling elements taper in the moving direction of the tubular sheeting and the length of the cooling zone is defined by the length of the cooling elements.

The essential feature of the cooling device according to the invention resides in the fact that the cooling elements can form a closed dimensionally variable hollow cylinder the smallest diameter of which corresponds to the diameter of the hollow space formed by 4 cooling segments, as well as a closed truncated cone with diminishing diameter in the moving direction of the tubular sheeting.

The conic hollow space can be enlarged and diminished symmetrically to the axis with respect to its circumference and its angle of convergence. The circumference of the conic hollow space depends on the diameter of the extruded tube.

The angle of convergence is the acute angle $\alpha$ (angle of gradient) between the imaginary base area of the truncated cone and its surface line.

The angle of gradient $\alpha$ is determined by the length of the cooling zone (cooling elements) and the difference in diameter between the imaginary circular lower and upper surface of the truncated cone.

It is expedient to choose the smallest adjustment of α in such a manner that the difference in the diameters is at most 10 %, preferably at most 3 % and more preferably in the range of from 0.5 to 2 %. In a device, in which the imaginary circular inlet area of the cooling cone has a diameter of 500 mm and a length of 200 mm the angle α is 89°17′ with a difference of the inlet and outlet areas of 1 % and 87°51′ with a difference in the diameters of 3 %. With a length of the cooling zone of 700 mm, instead of 200 mm, the corresponding values of α are 89°48′ and 89°24′.

The acute angles β and γ of the cooling segments and cooling plates, respectively, depend on the angle of gradient α. Angle β of the cooling segments should by smaller, preferably by 0.5 to 2°, than the smallest adjustment of α, whereas the angle γ of the cooling plates may be equal to but preferably it should be smaller, for example by 0.5 to 1°, than the smallest adjustment of α.

The cooling elements of the cooling device in accordance with the invention are mounted in such a manner that the cooling plates lie on the cooling segments. When the cooling segments are shifted the cooling plates are necessarily adjusted at the same time.

To adjust the cooling segments they are fastened, for example, on toothed rods with assigned two-piece driving shafts connected by sprocket chains, one driving shaft acting as main drive. The cooling plates are fastened on shafts provided with springs whereby they are pressed against the cooling segments. When the cooling segments are displaced by the action of the main drive, for example to enlarge or reduce the hollow cooling zone or to adjust a desired angle α, the cooling plates are simultaneously shifted by the cooling segments themselves and with the aid of the springs. The adjustment of a determined angle α is brought about, for example, by a clutch coupling the two-piece driving shafts. By decoupling the cooling elements can be adjusted to the desired angle of gradient.

The cooling elements are preferably hollow bodies provided with inlet and outlet for a cooling medium. Alternatively, the cooling medium can be circulated at the back sides of the cooling elements in appropriate headpieces. To prevent the tubular sheeting from sticking on the cooling surfaces the cooling elements are provided with perforations through which cooling air is blown onto the tube on passing through the cooling zone.

The cooling elements can be made of metal, and preferably of a thermostable plastic material.

The cooling device according to the invention can be used in the manufacture of blown films or tubular sheeting from thermoplastic materials, preferably polyolefins and especially polyvinyl chloride.

As compared to known cooling devices the device according to the invention is distinguished by special advantages. Due to the fact that the cooling zone is closed, the film or sheeting is uniformly cooled and the conical shape of the cooling zone ensures a permanent contact of the cooling elements with the tube on passing through the cooling zone, since the shape of the cooling zone is easily adapted to the respective diameter of the tube.

The tube emerging from the extruder is pressed against the cooling elements and, on passing the cooling zone, continually cooled over its whole surface.

Due to this continual cooling the tubular sheeting is free from different tensions and, hence, its final quality is greatly improved.

Owing to the uniform and rapid cooling action and the exact adaption of the cooling surface to the shape of the tube over the entire length of the cooling zone a high production rate is achieved with the device according to the invention.

The device in accordance with the invention will now be illustrated by way of example with reference to the accompanying drawings in which FIG. 1 is a top view of a cooling device with smallest possible adjustment of the cooling zone;

FIG. 4 is a side view of a cooling segment;

FIG. 5 is a side view of a cooling plate;

FIG. 6 is a top view of a cooling segment;

FIG. 7 is a top view of a cooling plate.

Figure 1:
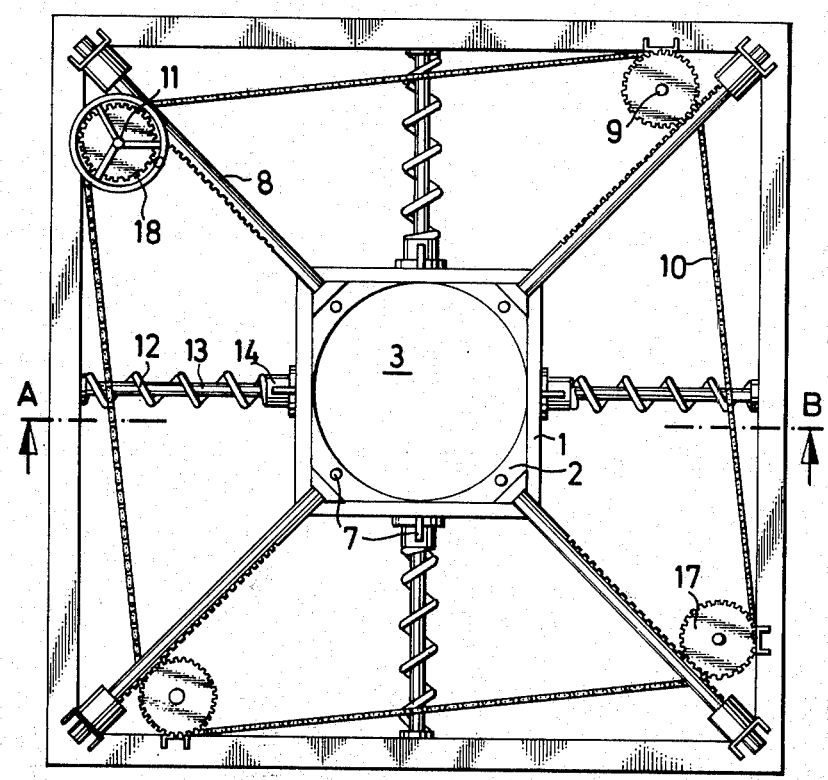
Figure 2:
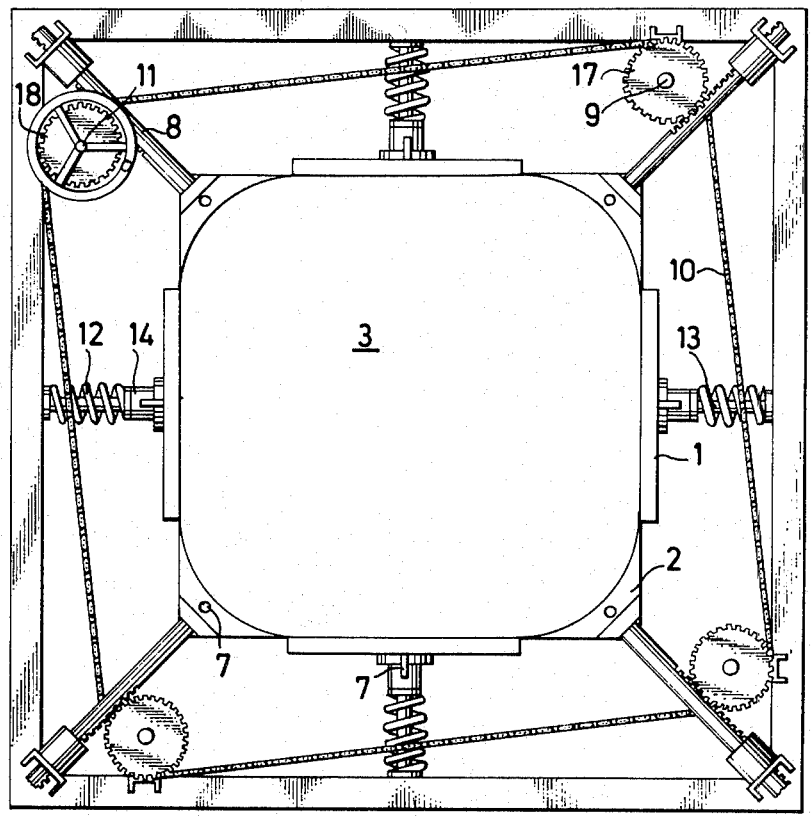
FIG. 2 is a top view of the cooling device of FIG. 1 with largest possible adjustment of the cooling zone.
Figure 3:
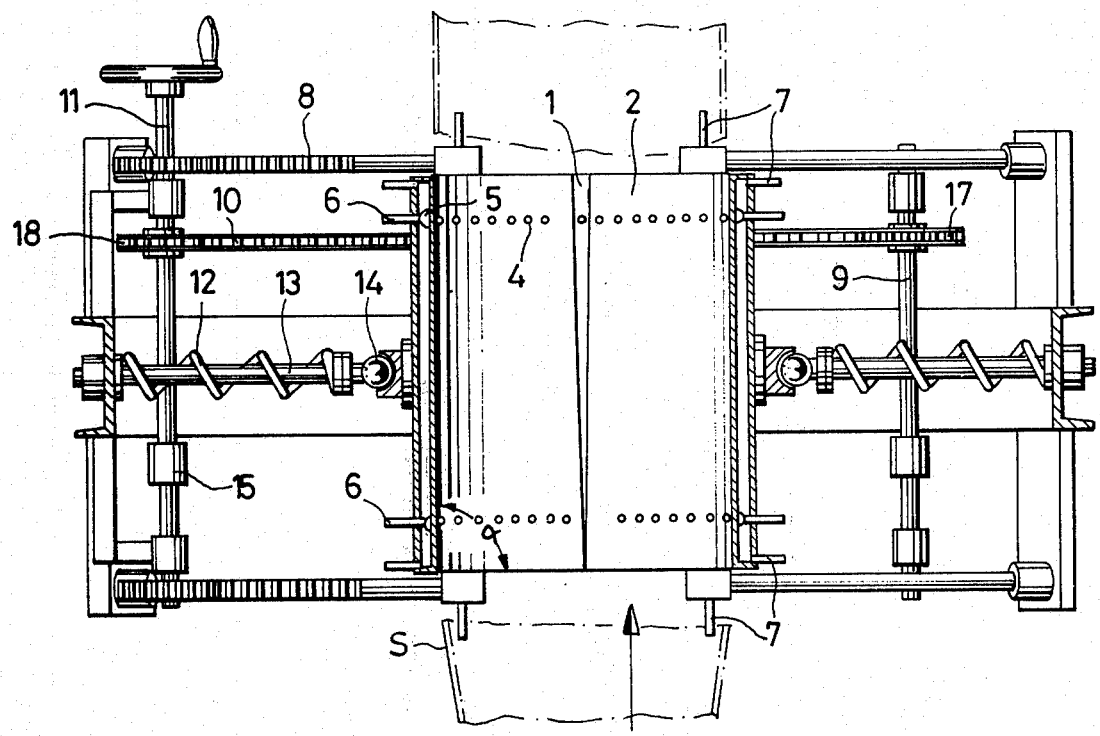
FIG. 3 is a longitudinal section along line A – B of the cooling device shown in FIG. 1.

Referring to the drawings: the cooling device comprises four cooling plates 1 and four cooling segments 2. In the moving direction of the tube they embrace a space having the form of a truncated cone 3 and an angle of convergence α. By shifting the cooling elements the circumference of the cooling zone and the angle α can be enlarged or reduced.

Cooling plates 1 have a plane outer and inner surface and the shape of a regular trapezoid, the acute angle γ being formed by the larger of the two parallel sides and one inclined side. According to a preferred embodiment the angle γ is 88.5°. The cooling plates are provided with perforations 4 through which cooling air is blown onto the tube wall. The cooling air is introduced through pipes 6 connected by welding into chambers 5 and blown onto the tube through perforations 4. The cooling plates are further provided with inlet and outlet pipes 7 for the cooling medium.

The cooling segments have a triangular cross section, a curved inner surface, two acute outer edges and a degree of tapering, expressed by angle β preferably of 88°30′. The two plane outer surfaces 16 of the cooling segments meet at an angle of 90°.

The individual cooling segments are also provided with inlet and outlet 7 for the cooling medium and perforations 4 for the cooling air supplied through pipes 6 and chambers 5.

The cooling segments are fastened on toothed racks 8 operated by driving shafts 9 with sprocket wheels 17 connected by a chain 10. One of the driving shafts with sprocket wheel 18 acts as main drive 11.

The cooling plates 1, which are connected with guide shafts 13 by means of ball joints 14 are pressed against cooling segments 2 by means of springs 12 so that they necessarily follow any adjustment of the cooling segments.

The main driving shaft 11 and the driving shafts (9) are composed of two pieces each which are connected by a coupling 15. By decoupling the segments can be brought in an inclined position with respect to the axis of extrusion, whereby the cooling plates are also shifted. In this manner the hollow space formed by the two types of cooling means can be varied in transverse as well as in inclined direction with respect to the axis of extrusion.

The tubular sheeting S emerging from the extruder leans with its outer surface on the cooling elements, its is passed through the cooling zone, subsequently flattened as usual and wound up (not represented).

I claim:

1. A cooling device for tubular sheeting comprising adjustable cooling elements having a cooling agent and forming a cooling zone surrounding the tubular sheeting wherein plane cooling elements and segmental cooling elements alternate to form a closed hollow space as cooling zone; the plane cooling elements being in the form of plates having a universally plane and regular trapezoidal shape, the segmental cooling elements being in the form of plates tapering off in the running direction of the tubular sheeting and having a curved inner surface as well as an outer surface formed by two equal plane faces extending to the outer edges of the plate and meeting at a right angle or an angle greater than 90°C; the plane cooling elements being located on the adjacent segmental cooling elements and both said cooling elements being arranged in a manner adjustable transversely as well as in inclined direction with respect to the axis of the hollow space so that the hollow space is the shape either of a cylinder or of a truncated cone.

2. The cooling device of claim 1, wherein the segmental cooling elements are provided with adjusting means and the plane cooling elements are arranged in such a manner that they are simultaneously adjusted.

3. The cooling device of claim 1, wherein the conical hollow space is the shape of a truncated cone and capable of being varied symmetrically to its axis.

4. The cooling device of claim 1 wherein the cooling elements are provided with inlets and outlets and distributing ducts with perforations through which a cooling gas can be blown onto the tubular sheeting.

* * * * *